ns, 1957

2,803,620

VULCANIZATION OF BUTYL RUBBER WITH DI-METHYLOL PHENOL PRODUCT AND TRI-PHENYL STIBINE

George S. Mills, Clifton, N. J., assignor to United States Rubber Company, New York, N. Y., a corporation of New Jersey No Drawing. Application March 31, 1953,
Serial No. 346,030

15 Claims. (Cl. 260—43)

This invention relates to improved Butyl rubber vulcanizates, and, more particularly, it relates to Butyl rubber vulcanizates characterized by improved resistance to oxidation, especially in the presence of steam.

Butyl rubber vulcanizates in certain applications fail principally through oxidation. Thus, Butyl rubber curing bags for vulcanizing pneumatic tires fail principally through development of a gummy internal surface condition which mechanically obstructs the curing bag valves and causes reduction of the wall thickness of the bag through erosion. It has been demonstrated that this gumminess results from oxidative aging brought about by air introduced in various ways.

It is possible to prepare Butyl rubber vulcanizates that are improved in this respect by employing as the vulcanizing agent a 2,6-dimethylol-4-substituted phenol, but even in these improved stocks further improvement in resistance to oxidation has been desired. However, conventional anti-oxidants of the amine or phenolic types do not retard this oxidative softening of Butyl rubber vulcanizates, whether cured with sulfur or cured with a 2,6-dimethylol-4-substituted phenol.

I have now discovered, unexpectedly, that the chemical triphenyl stibine, when included in Butyl rubber vulcanizates cured with a 2,6-dimethylol-4-substituted phenol, greatly improves retention of physical properties of the vulcanizate during oxidative aging.

My invention is most commonly practiced with Butyl rubber made by copolymerizing isobutylene with a small amount of isoprene. However, other types of Butyl rubber made by copolymerizing an isoolefin with a minor proportion of a multi olefinic unsaturate may be used. The isoolefins used generally have from 4 to 7 carbon atoms, and such isomonoolefins as isobutylene or ethyl methyl ethylene are preferred. The multiolefinic unsaturate usually is an aliphatic conjugated diolefin having from 4 to 6 carbon atoms, and is preferably isoprene or butadiene. Other suitable diolefins that may be mentioned are such compounds as piperylene; 2,3-dimethyl butadiene-1,3; 3-methylpentadiene-1,3; 2-methylpentadiene-1,3; 1,3-hexadiene; and 2,4-hexadiene. The Butyl rubber contains only relatively small amounts of copolymerized diene, typically from about 0.5 to 5%, and seldom more than 10%, on the total weight of the elastomer. For the sake of convenience and brevity, the various possible synthetic rubbers within this class will be designated generally by the term Butyl rubber.

The 2,6-dimethylol-4-substituted phenol employed as the curative for the Butyl rubber in the invention generally has a hydrocarbon group in the 4- position, e. g., an alkyl group, especially an alkyl group having from 3 to 20 carbon atoms; a cycloalkyl group; an aryl group exemplified by phenyl, or an aralkyl group, exemplified by benzyl and cumyl. Lower alkyl groups constitute preferred 4- substituents, especially lower alkyl groups having from 4 to 8 carbon atoms, and tertiarybutyl and tt - octyl (alpha,alpha,gamma,gamma - tetramethylbutyl) are especially outstanding. Further examples of suitable 2,6-dimethylol-4-substituted phenols that may be used in the invention are as follows:

2,6-dimethylol-4-methylphenol
2,6-dimethylol-4-dodecyl phenol
2,6-dimethylol-4-(alpha,alpha,dimethyl benzyl)phenol
2,6-dimethylol-4-cyclohexyl phenol The 2,6-dimethylol-4-substituted phenol may be employed as the vulcanizing agent either as such in its monomeric form or it may be employed in the form of a resinous self-condensation product. The polymeric or condensed forms of the 2,6-di-methylol-4-substituted phenols are heat-reactive, oil-soluble resinous materials of the type known as resols. The resinous forms of the curing agent are preferred for use in the invention. Mixtures of the resinous self-condensation products of the 2,6-dimethylol-4-substituted phenols with more or less of the low molecular weight or monomeric forms are also useful. For convenience, the term 2,6-dimethylol-4-substituted phenol will be used to refer to any of the monomeric or polymeric compounds, or to mixtures thereof, unless otherwise stated.

The 2,6-dimethylol-4-substituted phenol curing agent is generally employed in amount within the range of from about 2 to 15 parts by weight to 100 parts of the Butyl rubber. It is usually found that less than 2 parts of the curing agent is insufficient to produce a practical cure within a reasonable time. Indefinitely larger amounts of the curing agent may be used, e. g., 20 parts, but amounts greater than this are ordinarily without further advantage, unless an unusually hard and resin-like vulcanizate is desired. The vulcanization of Butyl rubber with the 2,6-dimethylol-4-substituted phenols does not per se constitute the novel aspect of the present invention, and such vulcanization is described in more detail and claimed in copending application of Tawney and Little, Serial No. 266,146, filed January 12, 1952, now Patent No. 2,701,895, and assigned to the same assignee as the instant application.

The triphenyl stibine employed as the anti-oxidant in the invention may be compounded with the Butyl rubber and with the 2,6-dimethylol-4- substituted phenol in any suitable manner, such as by mixing the ingredients on a rubber mill, in any desired order, with or without other desired auxiliary compounding ingredients, such as accelerators, fillers or pigments, softeners, and the like. The amount of triphenyl stibine employed in the invention is in no way critical, and, for ordinary purposes one or two parts of this material, per 100 parts of the Butyl rubber, is usually appropriate. Ordinarily there is no proportionate added advantage in using more than about 5 parts of the triphenyl stibine.

The vulcanizable mixture may be fabricated into the desired form by the usual methods, such as calendering, extrusion or molding.

The vulcanization of the mixture of Butyl rubber, 2,6-dimethylol-4-substituted phenol, and triphenyl stibine is conveniently carried out at temperatures of 250° F. or higher, and preferably at temperatures in excess of 300° F., for periods of time ranging from about 5 minutes to 3 hours, the longer periods of time within the stated time range being employed with the lower temperatures. The most preferred vulcanizing temperatures are within the range of about 320° to 370° F., although somewhat higher temperatures may be employed, e. g., 390° or 400° F., provided that such highly elevated temperatures are not maintained for a sufficiently long time to cause thermal injury to the vulcanizate.

The benefits obtained by incorporating triphenyl stibine in the vulcanizate in accordance with the invention are indicated particularly by improved retention of modulus and tensile strength after air aging in steam for prolonged periods. Also, it is observed that stickiness of the surface of the vulcanizates of the invention upon aging in steam in the presence of oxygen is remarkably reduced, in comparison to similar vulcanizates which do not contain the triphenyl stibine. The unexpected benefits conferred by the triphenyl stibine are particularly surprising in view of the fact that this chemical does not benefit oxidative aging of similar Butyl rubber stocks cured with sulfur instead of with 2,6-dimethylol-4-substituted phenol.

The superior resistance to steam and oxidation of the vulcanizates of the invention renders them particularly desirable for such applications as making curing bags for pneumatic tires, packings, victaulic rings, steam hose, and similar articles and, in fact, any other application where resistance to steam in the presence of oxygen is required.

The following example will serve to illustrate the practice of the invention.

*Example*

A Butyl rubber masterbatch of the composition shown in the following table was mixed on a rubber mill. The Butyl rubber was of the kind known as GR–I–15, which is a copolymer of isobutylene containing about 2.5% of isoprene. The masterbatch contained, as the vulcanizing agent, a resinous self-condensation product of a 2,6-dimethylol-4-substituted phenol, namely, a commercially available resol type of phenolic resin sold under the trade name Amberol ST–137 that is believed to be made from about 1 mole of p-octyl phenol and 2 moles of formaldehyde in an alkaline medium.

|  | Parts |
|---|---|
| GR–I–15 | 100 |
| Carbon black (Philblack O) | 60 |
| Amberol ST–137 | 12 |
|  | 172 |

Portions of the foregoing masterbatch were mixed with varying quantities of triphenyl stibine, as indicated in the table below, and samples of the resulting mixes 0.015 inch thick were cured in molds in a press for 140 minutes at 90 pounds of steam. The green or unaged physical properties of the resulting vulcanizates were then determined, following which the samples were aged by suspending them in a rack above the water level in a thermostatically controlled autoclave one-third filled with distilled water. The autoclave was closed to prevent the escape of atmospheric air therefrom, and it was then heated to such a temperature that a pressure of 1.5 atmospheres was developed. The samples were exposed to the resulting mixture of air and steam at a pressure of 1.5 atmospheres for 24 hours. The physical properties of the aged samples were then determined for comparison with those of the unaged vulcanizate, with the results shown in the following table:

(CONTROL)

| Parts of Triphenyl Stibine (Per 100 Parts of Butyl Rubber) | 0 | 1 | 2 | 4 |
|---|---|---|---|---|
| Green Test Data: |  |  |  |  |
| Modulus at 200% Elongation, p. s. i | 920 | 680 | 610 | 580 |
| Tensile Strength, p. s. i | 1,800 | 1,920 | 1,780 | 2,100 |
| Elongation at Break, percent | 380 | 440 | 420 | 490 |
| Oxidative Steam Aged Data: |  |  |  |  |
| Modulus at 200% Elongation, p. s. i | 0–60 | 280 | 360 | 460 |
| Tensile Strength, p. s. i | 0–170 | 370 | 650 | 740 |
| Elongation at Break, percent | 0–340 | 310 | 310 | 320 |

From the foregoing data it will be apparent that the vulcanizates of the invention containing triphenyl stibine as an anti-oxidant retained a substantial proportion of their original properties, whereas a similar vulcanizate containing no triphenyl stibine deteriorated so thoroughly that the physical properties could not even be measured.

Having thus described my invention, what I claim and desire to protect by Letters Patent is:

1. An improved vulcanizate comprising a rubbery copolymer of an isomonoolefin having from 4 to 7 carbon atoms with from 0.5 to 10% of a conjugated aliphatic diolefin having from 4 to 6 carbon atoms, vulcanized with a 2,6-dimethylol-4-hydrocarbon phenol, and containing triphenyl stibine in amount sufficient to protect said vulcanizate against oxidative aging in the presence of steam.

2. An improved vulcanizate comprising a rubbery copolymer of an isomonoolefin having from 4 to 7 carbon atoms with from 0.5 to 10% of a conjugated aliphatic diolefin having from 4 to 6 carbon atoms, vulcanized with a resinous self-condensation product of a 2,6-dimethylol-4-hydrocarbon phenol, and containing triphenyl stibine in amount sufficient to protect said vulcanizate against oxidative aging in the presence of steam.

3. An improved vulcanizate comprising a rubbery copolymer of an isomonoolefin having from 4 to 7 carbon atoms with from 0.5 to 10% of a conjugated aliphatic diolefin having from 4 to 6 carbon atoms, vulcanized with a resinous self-condensation product of a 2,6-dimethylol-4-alkyl phenol in which the alkyl group contains from 4 to 8 carbon atoms, and containing triphenyl stibine in amount sufficient to protect said vulcanizate against oxidative aging in the presence of steam.

4. An improved vulcanizate comprising a rubbery copolymer of an isomonoolefin having from 4 to 7 carbon atoms with from 0.5 to 10% of a conjugated aliphatic diolefin having from 4 to 6 carbon atoms, vulcanized with a resinous self-condensation product of a 2,6-dimethylol-4-tertiary-butyl phenol, and containing triphenyl stibine in amount sufficient to protect said vulcanizate against oxidative aging in the presence of steam.

5. An improved vulcanizate comprising a rubbery copolymer of an isomonoolefin having from 4 to 7 carbon atoms with from 0.5 to 10% of a conjugated aliphatic diolefin having from 4 to 6 carbon atoms, vulcanized with a resinous self-condensation product of a 2,6-dimethylol-4-(alpha, alpha, gamma, gamma-tetramethylbutyl) phenol, and containing triphenyl stibine in amount sufficient to protect said vulcanizate against oxidative aging in the presence of steam.

6. An improved vulcanizate comprising a rubbery copolymer of isobutylene with from 0.5 to 10% of isoprene, vulcanized with a 2,6-dimethylol-4-hydrocarbon phenol, and containing triphenyl stibine in amount sufficient to protect said vulcanizate against oxidative aging in the presence of steam.

7. An improved vulcanizate comprising a rubbery copolymer of isobutylene with from 0.5 to 10% of isoprene, vulcanized with a resinous self-condensation product of a 2,6-dimethylol-4-hydrocarbon phenol, and containing triphenyl stibine in amount sufficient to protect said vulcanizate against oxidative aging in the presence of steam.

8. An improved vulcanizate comprising a rubbery copolymer of isobutylene with from 0.5 to 10% of isoprene, vulcanized with a resinous self-condensation product of a 2,6-dimethylol-4-alkyl phenol in which the alkyl group contains from 4 to 8 carbon atoms, and containing triphenyl stibine in amount sufficient to protect said vulcanizate against oxidative aging in the presence of steam.

9. An improved vulcanizate comprising a rubbery copolymer of isobutylene with from 0.5 to 10% of isoprene, vulcanized with a resinous self-condensation product of a 2,6-dimethylol-4-tertiary-butyl phenol, and containing triphenyl stibine in amount sufficient to protect said vulcanizate against oxidative aging in the presence of steam.

10. An improved vulcanizate comprising a rubbery copolymer of isobutylene with from 0.5 to 10% of isoprene, vulcanized with a resinous self-condensation product of a 2,6-dimethylol-4-(alpha, alpha, gamma, gamma-tetramethylbutyl) phenol, and containing triphenyl stibine in amount sufficient to protect said vulcanizate against oxidative aging in the presence of steam.

11. An improved vulcanizate comprising a rubbery copolymer of isobutylene with from 0.5 to 5% of isoprene vulcanized with a 2,6-dimethylol-4-alkyl phenol in which the alkyl group contains from 4 to 8 carbon atoms, and containing triphenyl stibine in amount sufficient to protect said vulcanizate against oxidative aging in the presence of steam.

12. An improved vulcanizate comprising a rubbery copolymer of isobutylene with from 0.5 to 5% of isoprene vulcanized with a 2,6-dimethylol-4-tertiary-butyl phenol, and containing triphenyl stibine in amount sufficient to protect said vulcanizate against oxidative aging in the presence of steam.

13. An improved vulcanizate comprising a rubbery copolymer of isobutylene with from 0.5 to 5% of isoprene vulcanized with a 2,6-dimethylol-4-(alpha, alpha, gamma, gamma-tetramethylbutyl) phenol, and containing triphenyl stibine in amount sufficient to protect said vulcanizate against oxidative aging in the presence of steam.

14. An improved vulcanizate comprising a rubbery copolymer of isobutylene with from 0.5 to 5% of isoprene vulcanized with an oil-soluble, heat-reactive resinous 2,6-dimethylol-4-tertiary-butyl phenol, and containing triphenyl stibine in amount sufficient to protect said vulcanizate against oxidative aging in the presence of steam.

15. An improved vulcanizate comprising a rubbery copolymer of isobutylene with from 0.5 to 5% of isoprene vulcanized with an oil-soluble, heat-reactive resinous 2,6-dimethylol-4-(alpha, alpha, gamma, gamma-tetramethylbutyl) phenol, and containing triphenyl stibine in amount sufficient to protect said vulcanizate against oxidative aging in the presence of steam.

References Cited in the file of this patent

UNITED STATES PATENTS

| | | |
|---|---|---|
| 2,314,466 | Thwaites | Mar. 23, 1943 |
| 2,701,895 | Tawney et al. | Feb. 15, 1955 |

FOREIGN PATENTS

| | | |
|---|---|---|
| 876,220 | France | July 20, 1942 |

OTHER REFERENCES

Rubber Age, January 1947, page 449.

Serial No. 357,662, Wildschut (A. P. C.), published Apr. 20, 1943.